(12) United States Patent
Kenneally et al.

(10) Patent No.: US 11,981,031 B2
(45) Date of Patent: May 14, 2024

(54) SYSTEMS AND METHODS FOR CONTROLLING ROBOTIC BEHAVIORS

(71) Applicant: The Trustees of the University of Pennsylvania, Philadelphia, PA (US)

(72) Inventors: Gavin Kenneally, Philadelphia, PA (US); Avik De, Philadelphia, PA (US); Daniel E. Koditschek, Philadelphia, PA (US); Thomas Turner Topping, Glenview, IL (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 586 days.

(21) Appl. No.: 16/326,320

(22) PCT Filed: Aug. 17, 2017

(86) PCT No.: PCT/US2017/047340
§ 371 (c)(1),
(2) Date: Feb. 18, 2019

(87) PCT Pub. No.: WO2018/035320
PCT Pub. Date: Feb. 22, 2018

(65) Prior Publication Data
US 2021/0299867 A1 Sep. 30, 2021

Related U.S. Application Data

(60) Provisional application No. 62/376,669, filed on Aug. 18, 2016.

(51) Int. Cl.
*B25J 9/16* (2006.01)
*B62D 57/032* (2006.01)

(52) U.S. Cl.
CPC .......... *B25J 9/1664* (2013.01); *B62D 57/032* (2013.01)

(58) Field of Classification Search
CPC .......... B25J 9/16; B25J 9/1664; B62D 57/00; B62D 57/02; B62D 57/032
USPC .................................. 700/245–264
See application file for complete search history.

(56) References Cited

U.S. PATENT DOCUMENTS

| 5,343,397 A * | 8/1994 | Yoshino | B62D 57/032 901/1 |
| 5,357,433 A * | 10/1994 | Takenaka | B62D 57/032 318/568.15 |
| 5,416,393 A * | 5/1995 | Gomi | B62D 57/032 901/1 |

(Continued)

FOREIGN PATENT DOCUMENTS

WO    WO 2013/123291 A1    8/2013

OTHER PUBLICATIONS

Notification of Transmittal of the International Search Report and the Written Opinion of the International Searching Authority, or the Declaration for International Application Serial No. PCT/US17/47340 (Dec. 5, 2017).

(Continued)

*Primary Examiner* — Jonathan L Sample
(74) *Attorney, Agent, or Firm* — Jenkins, Taylor & Hunt, P.A.

(57) ABSTRACT

A robot control system may be configured to control a robot having a plurality of limbs. The robot control system may control the robot to crawl, to open a door, to bound and or to climb stairs.

6 Claims, 17 Drawing Sheets

(56) References Cited

U.S. PATENT DOCUMENTS

| | | | | |
|---|---|---|---|---|
| 5,426,586 | A * | 6/1995 | Ozawa | B62D 57/032 414/730 |
| 5,739,655 | A * | 4/1998 | Torii | B62D 57/00 305/1 |
| 5,808,433 | A * | 9/1998 | Tagami | B62D 57/032 901/1 |
| 6,431,296 | B1 | 8/2002 | Won | |
| 6,668,951 | B2 * | 12/2003 | Won | B62D 55/14 180/9.1 |
| 7,011,171 | B1 | 3/2006 | Poulter | |
| 8,419,804 | B2 * | 4/2013 | Herr | A61H 1/0266 623/24 |
| 9,283,673 | B2 * | 3/2016 | Godowski | B25J 9/106 |
| 9,387,588 | B1 * | 7/2016 | Blankespoor | B25J 9/1692 |
| 9,387,896 | B1 * | 7/2016 | Blankespoor | B62D 57/032 |
| 9,440,353 | B1 * | 9/2016 | da Silva | B25J 9/1605 |
| 9,618,937 | B1 * | 4/2017 | Blankespoor | G05D 1/021 |
| 10,059,392 | B1 * | 8/2018 | Fay | B62D 57/032 |
| 10,081,098 | B1 * | 9/2018 | Nelson | B25J 19/02 |
| 10,926,409 | B1 * | 2/2021 | Palmer | B62D 57/032 |
| 11,059,532 | B1 * | 7/2021 | Fay | B25J 9/1664 |
| 2005/0077856 | A1 * | 4/2005 | Takenaka | F16F 9/0481 318/568.12 |
| 2005/0085948 | A1 * | 4/2005 | Herr | B62D 57/032 700/258 |
| 2005/0107916 | A1 * | 5/2005 | Nagasaka | B62D 57/02 700/245 |
| 2008/0147237 | A1 * | 6/2008 | Takenaka | B62D 57/032 700/254 |
| 2011/0172817 | A1 * | 7/2011 | Park | B25J 9/162 901/1 |
| 2011/0231050 | A1 * | 9/2011 | Goulding | G05D 1/0891 180/8.1 |
| 2012/0158182 | A1 * | 6/2012 | Lee | B25J 9/162 901/16 |
| 2013/0079929 | A1 * | 3/2013 | Lim | B62D 57/032 700/250 |
| 2013/0116820 | A1 * | 5/2013 | Lee | B62D 57/024 700/254 |
| 2013/0144439 | A1 * | 6/2013 | Lee | B62D 57/032 700/261 |
| 2013/0144441 | A1 * | 6/2013 | Kanazawa | B25J 9/1607 700/263 |
| 2013/0158712 | A1 * | 6/2013 | Lee | B62D 57/032 901/1 |
| 2013/0178983 | A1 * | 7/2013 | Watabe | G05D 1/0251 700/258 |
| 2013/0238183 | A1 * | 9/2013 | Goulding | B25J 9/1633 701/26 |
| 2016/0089786 | A1 * | 3/2016 | Kamioka | B62D 57/032 901/1 |
| 2016/0251044 | A1 * | 9/2016 | Klassen | B62D 57/028 180/8.7 |

OTHER PUBLICATIONS

Klein et al., "Use of Force and Attitude Sensors for Locomotion of a Legged Vehicle over Irregular Terrain," The International Journal of Robotics Research, vol. 2, No. 2, pp. 3-17 (Jun. 1983).
Banerjee et al., "Human-Supervised Control of the ATLAS Humanoid Robot for Traversing Doors," 2015 IEEE-RAS 15th International Conference on Humanoid Robots, pp. 1-7 (Nov. 2015).
Park et al., "Quadruped Bounding Control with Variable Duty Cycle via Vertical Impulse Scaling," The 2014 IEEE/RSJ International Conference on Intelligent Robots and Systems, pp. 1-9 (2014).
Pusey et al., "Free-Standing Leaping Experiments with a Power-Autonomous, Elastic-Spined Quadruped," http://kodlab.seas.upenn.edu/uploads/Main/spie_canid_2013.pdf, pp. 1-15 (2013).
Barasuol et al, "A Reactive Controller Framework for Quadrupedal Locomotion on Challenging Terrain," In Robotics and Automation (ICRA), pp. 1-8 (2013).
Owaki et al, "Gait Transition of Quadruped Robot without Interlimb Neural Connections," Proc. Dyn. Walk., pp. 1-3 (2012).
Çulha et al., "Quadrupedal Bounding with an Actuated Spinal Joint," 2011 IEEE International Conference on Robotics and Automation, pp. 1-6 (May 9-13, 2011).
Shkolnik et al., "Bounding on Rough Terrain with the LittleDog Robot," The International Journal of Robotics Research, vol. 30, No. 2, pp. 1-26 (2011).
Chen et al., "Trajectory planning for stair climbing in the leg-wheel hybrid mobile robot Quattroped," Robotics and Automation (ICRA), 2011 IEEE International Conference on, pp. 1229-1234 (2011).
Zhang et al, "Autonomous stair climbing for mobile tracked robot," 2011 IEEE International Symposium on Safety, Security, and Rescue Robotics, pp. 92-98 (2011).
Johnson et al., "Disturbance Detection, Identification, and Recovery by Gait Transition in Legged Robots," 2010 IEEE/RSJ International Conference on Intelligent Robits and Systems, pp. 1-9 (Oct. 18-22, 2010).
Chung et al., "Door-Opening Control of a Service Robot Using the Multifingered Robot Hand," IEEE Transactions on Industrial Electronics, vol. 56, No. 10, pp. 1-10 (Oct. 2009).
Arisumi et al., "Whole-body motion of a Humanoid robot for passing through a door—Opening a door by impulsive force—," The 2009 IEEE/RSJ International Conference on Intelligent Robots and Systems, pp. 428-434 (Oct. 11-15, 2009).
Görner et al, "The DLR Crawler: evaluation of gaits and control of an actively compliant six-legged walking robot," Emerald Group Publishing Limited, www.emerald.com/insight, pp. 1-3 (Jun. 19, 2009).
Eich et al., "A Versatile Stair-Climbing Robot for Search and Rescue Applications," 2008 IEEE International Workshop on Safety, Security and Rescue Robotics, pp. 35-40 (2008).
Herbert et al., "Loper: A Quadruped-Hybrid Stair Climbing Robot," 2008 IEEE International Conference on Robotics and Automation, pp. 1-6 (May 19-23, 2008).
Raibert et al, "BigDog, the Rough-Terrain Quadruped Robot," Proceedings of the 17th World Congress, The International Federation of Automatic Control, pp. 1-4 (Jul. 6-11, 2008).
Fu et al, "Gait Synthesis and Sensory Control of Stair Climbing for a Humanoid Robot" in IEEE Transactions on Industrial Electronics, vol. 55, No. 5, pp. 2111-2120 (May 2008).
Righetti et al., "Pattern Generators with sensory feedback for the control of quadruped locomotion," IEEE International Conference on Robotics and Automation, pp. 1-6 (Jun. 2008).
Mourikis et al., "Autonomous Stair Climbing for Tracked Vehicles," The International Journal of Robotics Research, vol. 26, No. 7, pp. 737-758 (Jul. 2007).
Pongas et al, "A robust quadruped walking gait for traversing rough terrain," Proceedings of 2007 IEEE International Conference on Robotics and Automation, pp. 1-6 (2007).
Rebula et al, "A controller for the littledog quadruped walking on rough terrain," Proceedings of 2007 IEEE International Conference on Robotics and Automation, pp. 1-7 (2007).
Cruse et al, "Insect walking is based on decentralized architecture revealing a simple and robust controller," Phil. Trans. R. Soc. A, vol. 365, pp. 221-250 (2007).
Yuan et al, "Research on leg-wheel hybrid stair-climbing robot, Zero Carrier," Robotics and Biomimetics, 2004. ROBIO 2004. IEEE International Conference on, pp. 654-659 (2004).
Gutmann et al., "Stair climbing for humanoid robots using stereo vision," Intelligent Robots and Systems, 2004, pp. 1407-1413 (2004).
Rhee et al., "Door opening control using the multi-fingered robotic hand for the indoor service robot," Proceedings of the 2004 IEEE, International Conference on Robotics & Automation, pp. 4011-4016 (Apr. 2004).
Hiller et al, "Design and control of a quadruped robot walking in unstructured terrain," Control Applications, 2004, Proceedings of the 2004 IEEE International Conference on., pp. 916-921 (2004).
Poulakakis et al., "Modeling and Experiments of Untethered Quadrupedal Running with a Bounding Gait: The Scout II Robot," International Journal of Robotics Research, pp. 1-34 (2003).

(56) References Cited

OTHER PUBLICATIONS

Moore et al, "Reliable stair climbing in the simple hexapod 'RHex'," Robotics and Automation, Proceedings ICRA '02, pp. 1-7 (2002).
Albert et al, "Detection of stair dimensions for the path planning of a bipedal robot," Advanced Intelligent Mechatronics, pp. 1291-1296 (2001).
Fukuoka et al, "Adaptive Dynamic Walking of a Quadruped Robot on Irregular Terrain based on biological concepts," The International Journal of Robotics Resarch, vol. 22, No. 3-4, pp. 187-202 (2003).
Billard et al, "Biologically inspired neural controllers for motor control in a quadruped robot," Neural Networks, vol. 6, pp. 1-5 (2000).
Wettergreen et al, "Developing planning and reactive control for a hexapod robot," www.ri.cmu.edu, pp. 1-6 (1996).
Kimura et al, "Dynamics in the dynamic walk of a quadruped robot," Advanced Robotics, pp. 1-15 (1998).
Buehler et al, "SCOUT: a simple quadruped that walks, climbs, and runs," Robotics and Automation, 1998. Proceedings. 1998 IEEE International Conference on, pp. 1-7 (1998).
Nagatani et al., "Designing a Behavior to Open a Door and to Pass through a Door-way using a Mobile Robot Equipped with a Manipulator," Shibaura Institute of Technology, pp. 847-853 (1994).
Murphy et al., "Trotting and bounding in a planar two-legged model," Theory and Practice of Robots and Manipulators, Springer, pp. 1-10 (1985).
McGhee et al, "Optimum Quadruped Creeping Gaits," University of Southern California, USCEE 294, pp. 1-39 (Jul. 1968).

\* cited by examiner

SYSTEMS AND METHODS FOR CONTROLLING ROBOTIC BEHAVIORS

CROSS-REFERENCE TO RELATED APPLICATION

This application claims priority from U.S. Provisional Application No. 62/376,669, filed Aug. 18, 2016, the entirety of which is incorporated by reference herein.

BRIEF DESCRIPTIONS OF THE DRAWINGS

DETAILED DESCRIPTION OF SEVERAL EMBODIMENTS

A variety of systems and methods for controlling robotic behaviors are described herein. For example, robots may be configured with multiple limbs. Robots may use their limbs for locomotion and/or to manipulate objects. Systems and methods described herein may be used to control robotic limbs to perform complicated tasks such as crawling, vertical locomotion, opening doors, bounding, and/or stair climbing, for example.

Figure 1:
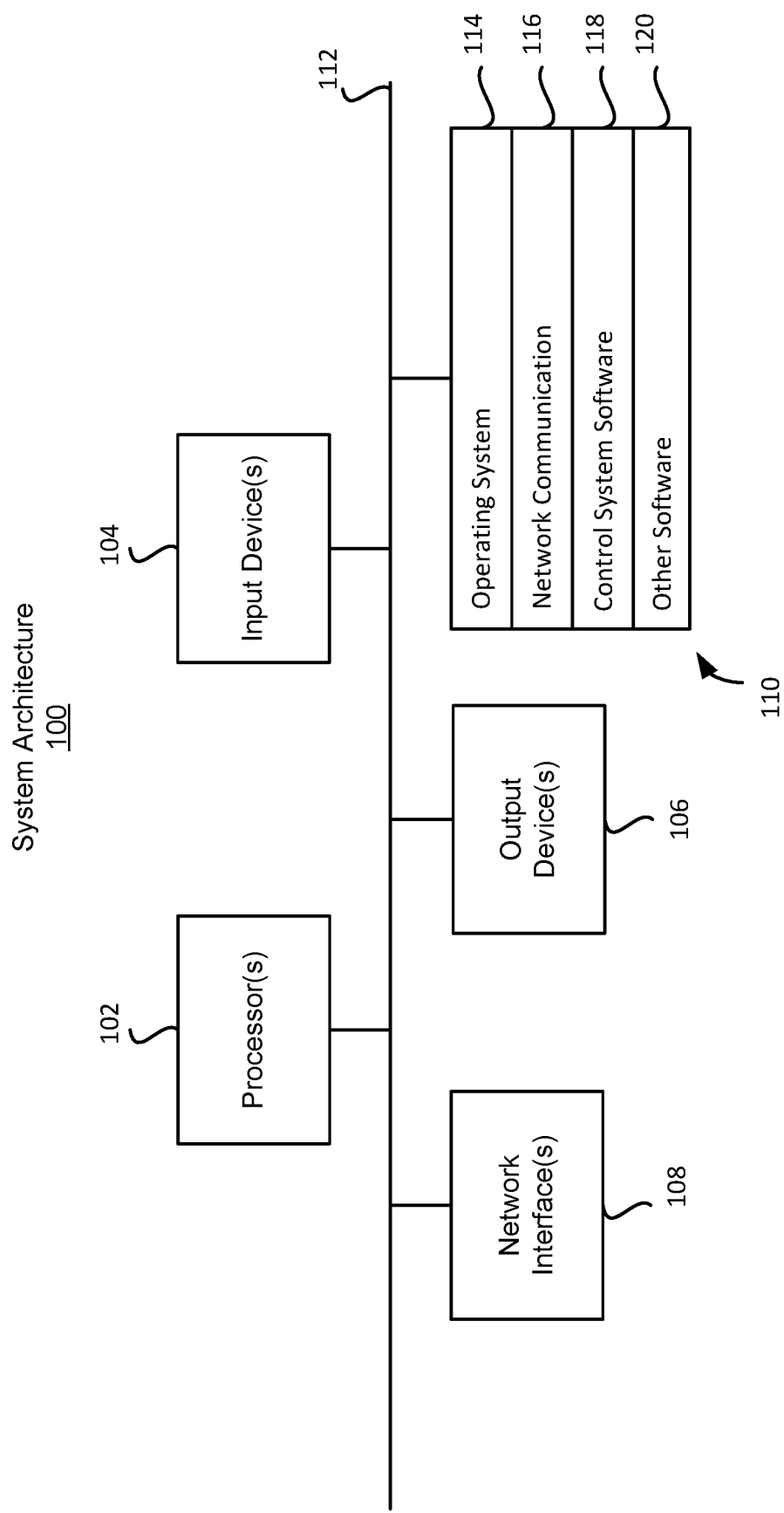
FIG. 1 is a block diagram of a control system according to an embodiment of the invention.

FIG. 1 is a block diagram of a control system 100 according to an embodiment of the invention. Control system 100 may be a component of a robot and/or may be in communication with a robot to control the robot. Example processes that control system 100 may perform to control a robot are described below.

Control system 100 may be implemented in a robot itself and/or on any electronic device that runs software applications derived from compiled instructions, including without limitation personal computers, servers, smart phones, media players, electronic tablets, game consoles, email devices, etc. In some embodiments, control system 100 may include one or more processors 102, one or more input devices 104 (e.g., sensors), one or more output devices 106 (e.g., robot limbs), one or more network interfaces 108, and/or one or more computer-readable mediums 110. These components may be coupled to one another by bus 112.

Input device 104 may be any element of the robot that can sense and/or generate data. Output device 106 may be any element of the robot that can be controlled. Processor 102 may use any processor technology, including but not limited to graphics processors and multi-core processors. Bus 112 may be any internal or external bus technology, including but not limited to ISA, EISA, PCI, PCI Express, NuBus, USB, Serial ATA or FireWire. Computer-readable medium 110 may be any medium that participates in providing instructions to processor 102 for execution, including without limitation, non-volatile storage media (e.g., optical disks, magnetic disks, flash drives, etc.), or volatile media (e.g., SDRAM, ROM, etc.).

Computer-readable medium 110 may include various instructions 114 for implementing an operating system (e.g., Mac OS®, Windows®, Linux). The operating system may be multi-user, multiprocessing, multitasking, multithreading, real-time, and/or the like. The operating system may perform basic tasks, including but not limited to: recognizing input from input device 104; sending output to output device 106; keeping track of files and directories on computer-readable medium 110; controlling peripheral devices which can be controlled directly or through an I/O controller; and managing traffic on bus 112. Network communications instructions 116 may establish and maintain network connections (e.g., software for implementing communication protocols, such as TCP/IP, HTTP, Ethernet, etc.).

Control system software 118 can include instructions that may perform the robotic behavior control disclosed herein. Other software 120 may include instructions for performing other robotic functions. In some embodiments, robotic behavior control and/or other robotic functions may be fully or partially implemented in operating system 114.

The described features may be implemented in one or more computer programs that may be executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

One or more features or steps of the disclosed embodiments may be implemented using an application programming interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

Crawl Gait for Horizontal and/or Vertical Locomotion Using Limb Loading for Swing Transition and/or Slip Recovery In some embodiments, a multilegged robot may move using a crawl gait (e.g., with at least three legs on the ground at all times), relying on quasistatic stability (e.g., where a dynamic center of gravity remains within a support polygon created by legs in contact with the ground) for locomotion along a horizontal substrate and/or climbing along a vertical substrate. Control system 100 may incorporate proprioceptive (or exteroceptive) leg loading estimation which may use limb kinematics together with a torque sensor or estimator on the motor, an external force sensor at a toe/end-effector to estimate weight supported by a limb, or a combination thereof.

Control system 100 may use leg loading information in swing to determine whether an obstacle is encountered before appropriate substrate contact using force/torque information gathered by one or more input devices 104 (e.g., motor torque sensor or estimator, external force sensor at a toe/end-effector, distributed force sensor/estimator along the leg, or a combination thereof).

Control system 100 may delay action of one or more output devices 106 (e.g., delay liftoff of any leg(s) in crawl sequence) until previous leg(s) is/are adequately loaded to ensure enough limbs are in contact with the substrate for quasistatic stability. Control system 100 may compensate for loss of traction when any limb in the sequence fails to bear sufficient load by reversing the step sequence or other step-recovery strategy.

The following table introduces some symbols used in the discussion of the crawling control processing performed by control system 100 and the meanings of these symbols.

TABLE 1

Symbols Found in Crawl Control Algorithms

| Symbol | Meaning | Symbol | Meaning |
| --- | --- | --- | --- |
| $f$ | Load estimate for leg (one for each leg) | $k_p$ | Leg virtual compliance spring constant |
| $J^{-T}$ | Leg Jacobian Inverse Transpose | $\theta$ | Vector of motor angles for each leg |
| $\theta_{des}$ | Desired motor angles for each leg | | |

Figure 2:
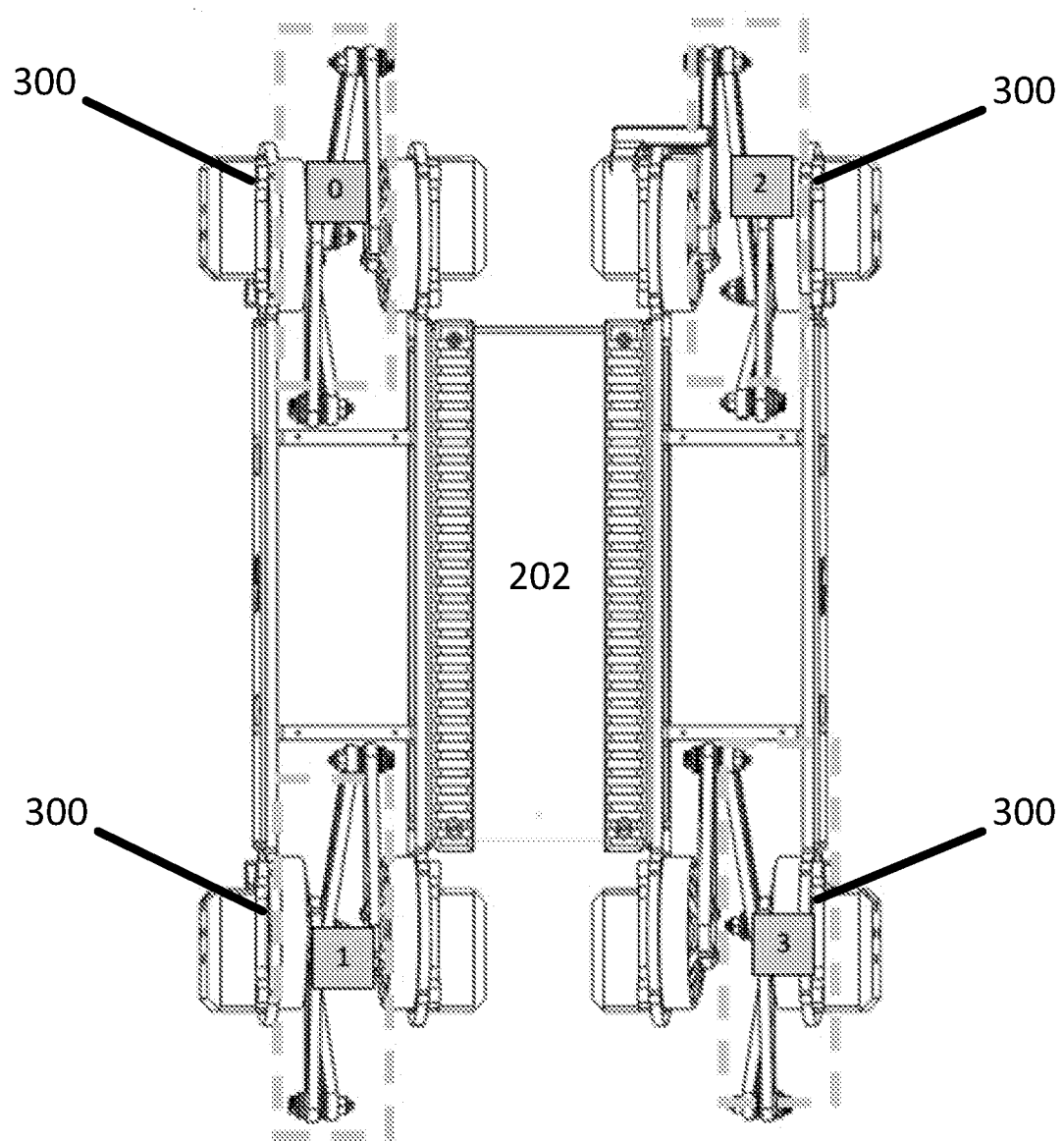
FIG. 2 is a top elevation view of a robot according to an embodiment of the invention.
Figure 3:
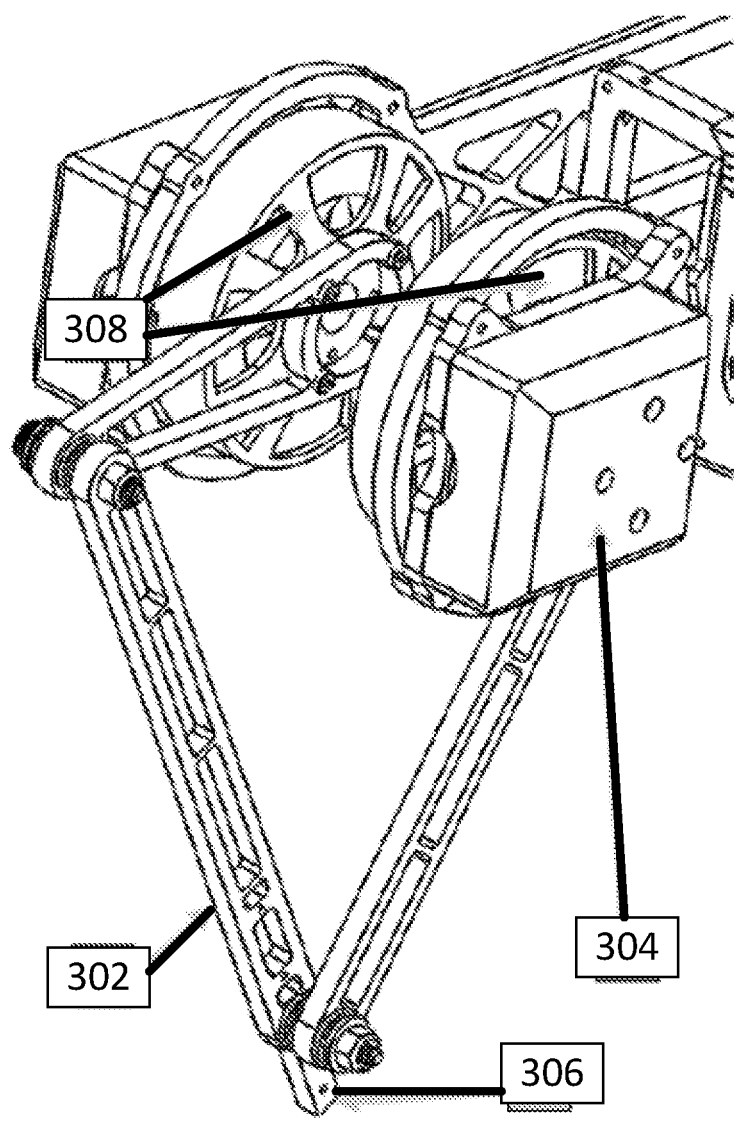
FIG. 3 is a perspective view of a robot limb according to an embodiment of the invention.

FIG. 2 is a top elevation view of a robot 200, and FIG. 3 is a perspective view of a robot limb 300, according to an embodiment of the invention. Robot 200 may include body 202 to which limbs 300 may be attached. Control system 100 (not shown in FIGS. 2-3) may be disposed within body 202 in some embodiments. In other embodiments, control system 100 may be remote from robot 200 and may communicate with a transceiver (not shown) of robot 200 over a network or other data connection.

The crawl gait control algorithm below is described as implemented on a quadrupedal robot 200 with legs 300 numbered (0)-(3). Control system 100 may be configured to communicate with each limb 300. Limbs 300-0, 300-1, 300-2, and 300-3 are numbered as they will be referred to for the remainder of this document.

Each limb 300 may be actuated by one or more motor actuators 308 that may be capable of retracting and/or protracting limb 300. Retraction and/or protraction be accomplished through many linkage designs, such as the five-bar linkage 302 shown in FIG. 3 or another kinematic linkage.

Robot 200 may include at least one feedback mechanism to estimate the load borne by each limb 300. For example, the feedback mechanism may include an encoder on the motors 304, a discrete force sensor placed at the toe/end-effector 306, or a distributed force sensor (or network) along the limb 300 (not shown). In the case where motors are used for proximal sensing, the limb load may be estimated as follows.

Motors may be configured for impedance control with a virtual compliance of $k_p$ for each motor. Control system 100 may use the assumption that the limb forward kinematics have Jacobian J. Then the vector of torques applied by the motors may be $k_p(\theta_{des}-\theta)$. Transforming through the limb kinematics, the end-effector force may be given as $f=k_p J^{-T}(\theta_{des}-\theta)$.

Figure 4:
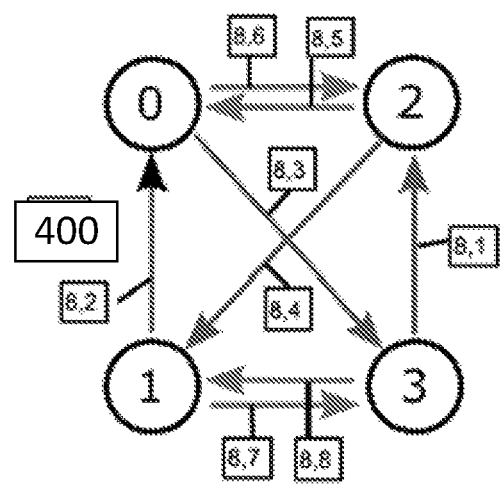
FIG. 4 is a limb connectivity network according to an embodiment of the invention.

An example crawl sequence may be as follows: hind right 300-3, fore right 300-2, hind left 300-1, fore left 300-0. This sequence may be chosen to maximize stability margin on flat ground, for example. FIG. 4 is a limb connectivity network 400 establishing the pattern of the example crawl sequence. Network 400 may work as follows: each of arrows 8,1-8,4 from limb i to limb j means that touchdown of limb i facilitates liftoff of leg j, each of arrows 8,5-8,8 from limb i to limb j means that liftoff of limb i inhibits liftoff of leg j.

A different crawl sequence from that shown in network 400 may be used as long as quasistatic stability is maintained. For example, crawls on robots with more than four legs that can have multiple legs simultaneously in swing may be performed according to different sequences.

Figure 5:
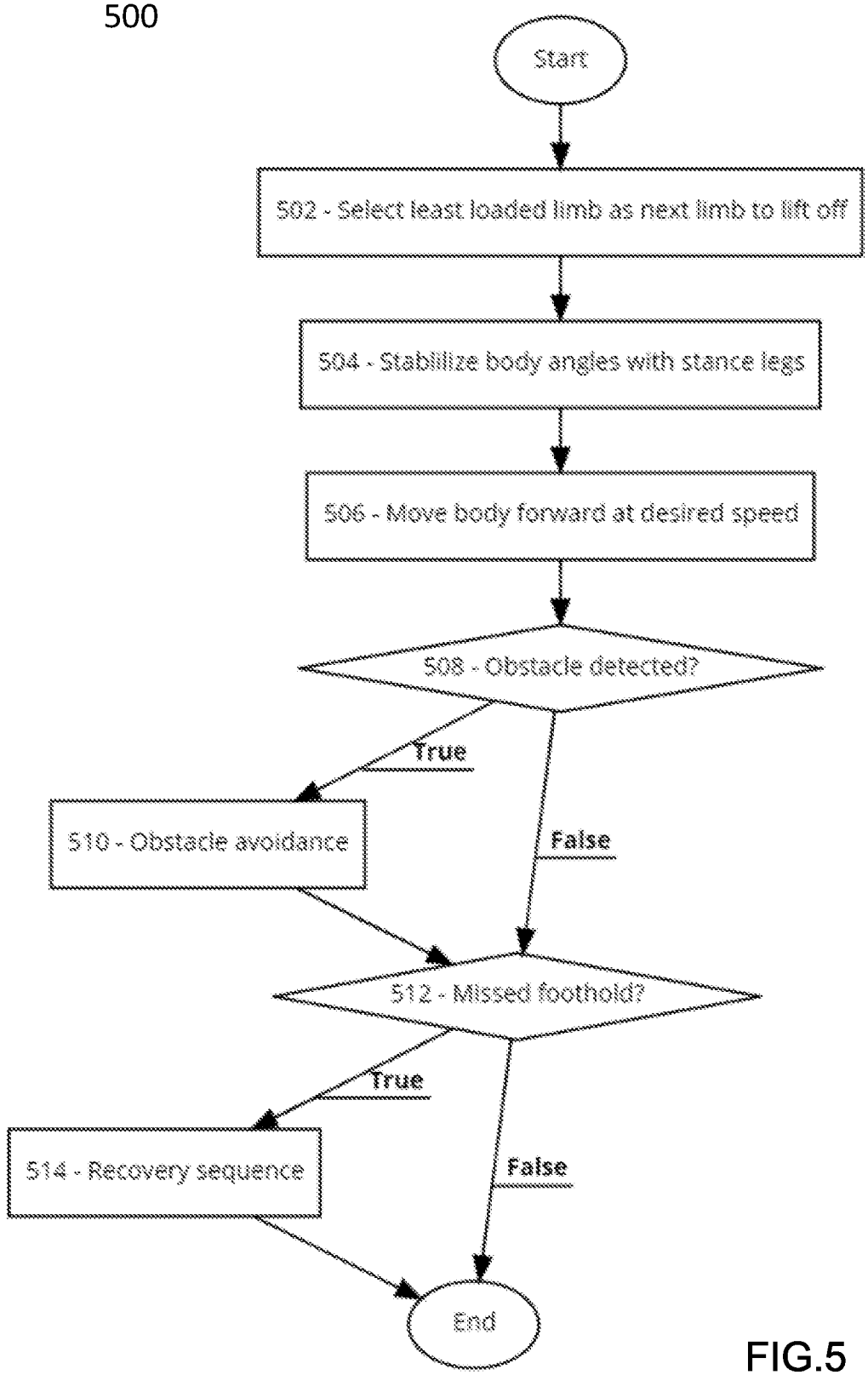
FIG. 5 is a crawl gait control process according to an embodiment of the invention.

FIG. 5 is a crawl gait control process 500 according to an embodiment of the invention. Control system 100 may perform process 500 to control limbs 300. Process 500 may establish a crawl sequence such as that shown in network 400, or a different crawl sequence, depending on characteristics of robot 200 and/or environmental conditions encountered by robot 200. In some embodiments, control system 100 may repeat process 500 each time a limb is to be moved.

Control system 100 may select a least loaded limb as the next limb to lift off 502. For example, the feedback mechanism acting as a limb loading estimator (as described above) may be used to determine the next best limb to lift off by selecting the least loaded limb as the next candidate. Control system 100 may command selected limb 300 to lift off.

In each stance phase (e.g., each phase where a new limb 300 is lifted), control system 100 may control stance limbs 300 to use their actuated degrees of freedom to stabilize the body angles as much as possible 504. For example, limbs 300 may be adjusted to compensate for rough terrain (e.g., walking on inclined ground, uneven climbing substrate, etc.).

Figure 6:
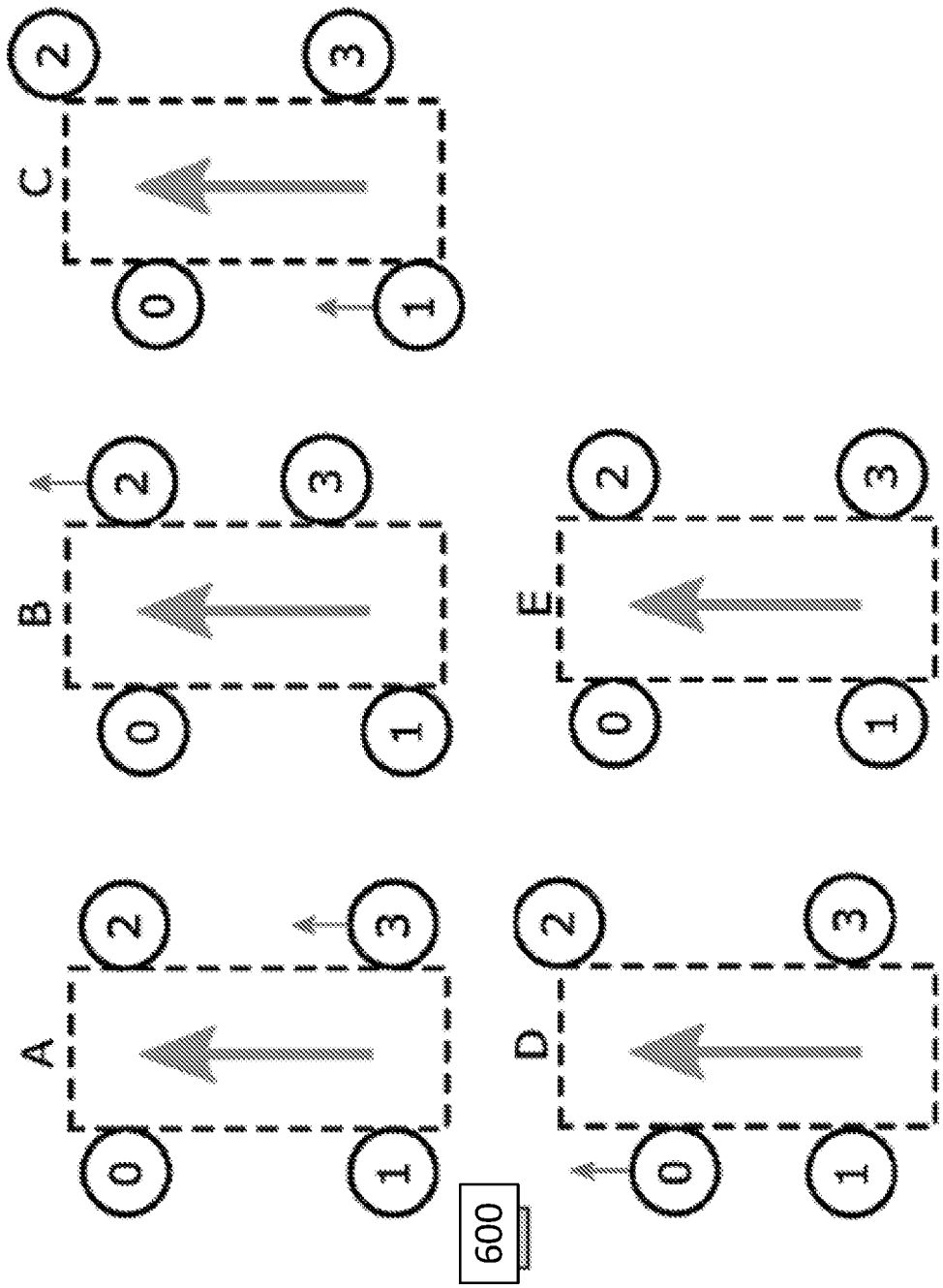
FIG. 6 is a crawl cycle according to an embodiment of the invention.

Control system 100 may pass a desired forward speed into the stance inverse dynamics, so that that body is moved forward by the leg angles changing in stance 506. Correspondingly, the touchdown angle for each leg may be determined from the body speed at liftoff. An example implementation is to touch down each leg at the negative of its liftoff angle. FIG. 6 is a crawl cycle 600 according to an embodiment of the invention, where panels A-F show an example forward progression in time in the absence of missed footholds and disturbances.

Returning to FIG. 5, control system 100 may detect and/or avoid obstacles that may affect limb 300 movement. The flight (swing) path of each limb 300 may be an open-loop speed-parameterized trajectory. Proprioceptive/exteroceptive obstacle avoidance may be incorporated into control system 100 by using the limb loading estimator. If an obstacle is detected during swing (e.g., through excessive limb load experienced before expected touchdown) 508, control system 100 may reactively alter the switch path (e.g., swing again to surmount obstacle) 510.

Figure 7:
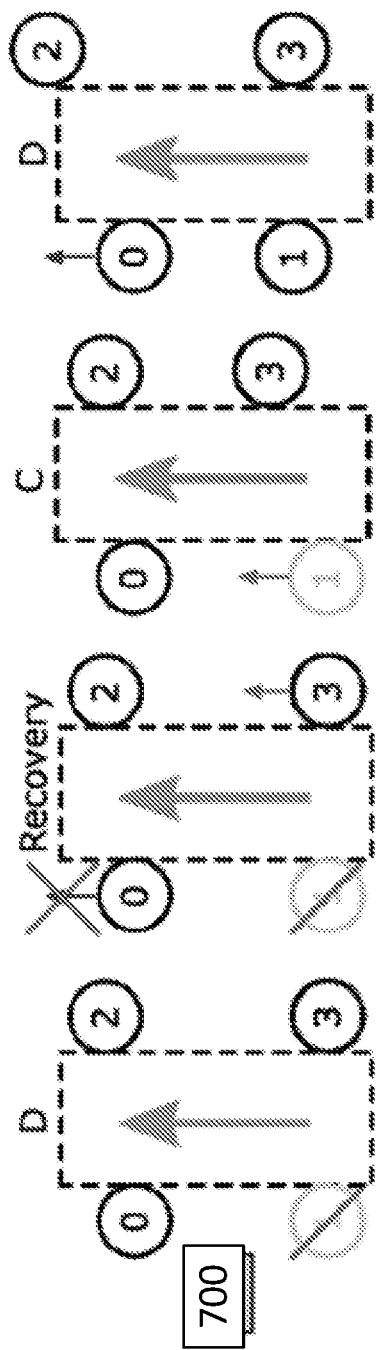
FIG. 7 is a recovery sequence according to an embodiment of the invention.

Control system 100 may detect missed footholds using the limb loading estimator 512, for example as the absence of sufficient limb load significantly after expected touchdown (e.g., due to loss of traction, missing toe support due to gap in substrate, etc.). Instead of proceeding with the same sequence, control system 100 may perform a recovery sequence 514. For example, FIG. 7 is a recovery sequence 700 according to an embodiment of the invention. In sequence 700, robot 200 may be slowed, and the lateral coupling may be activated (the touchdown of limb 300-3 and the next touchdown of limb 300-1 in this example is out of sequence, going from D back to C) before resuming the normal step sequence (e.g., cycle 600 of FIG. 6). Without this recovery step, robot 200 may get stuck, since limb 300-1 may never be sufficiently loaded to proceed with the standard sequence of cycle 600.

Figure 8:
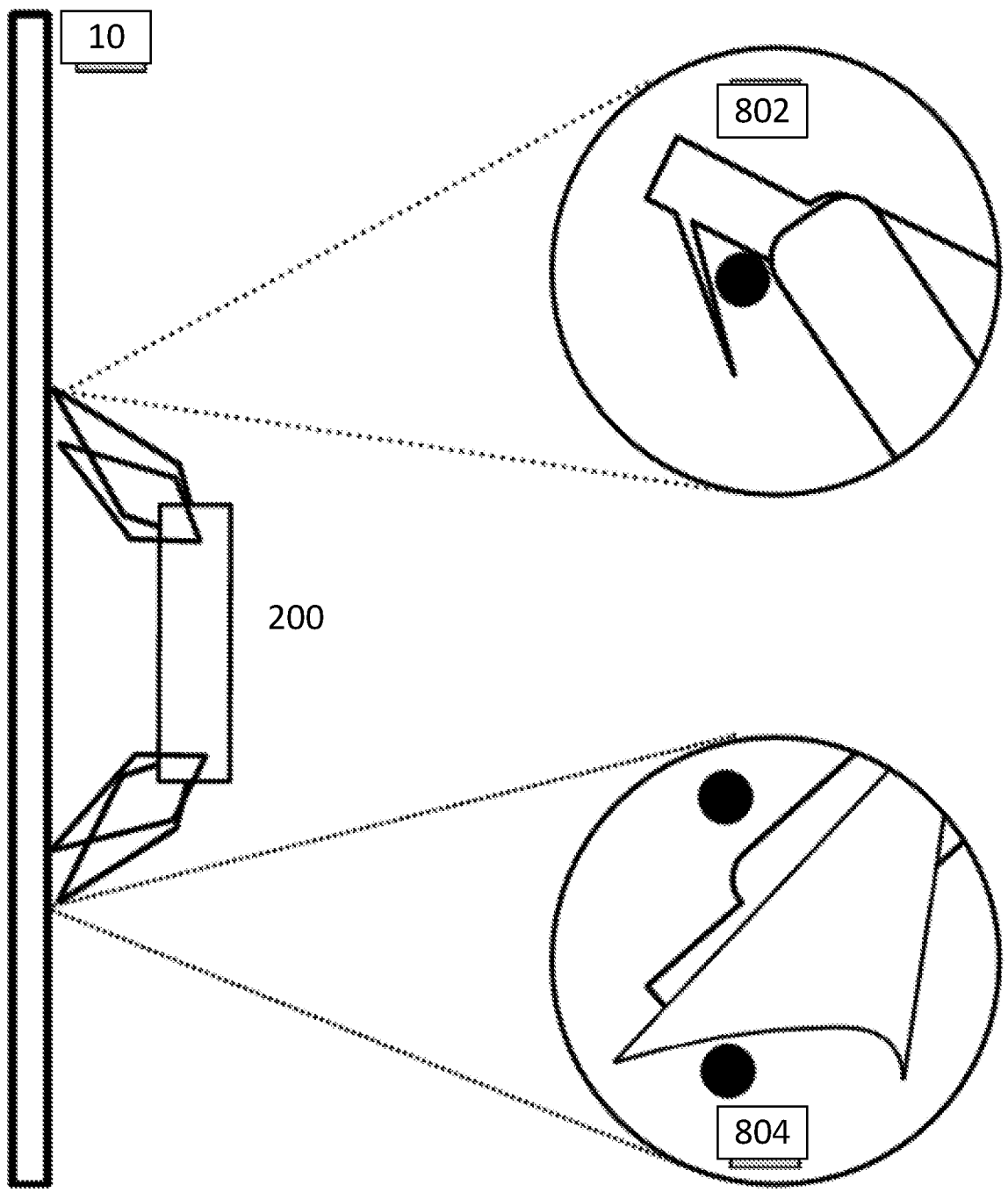
FIG. 8 is side elevation view of a robot with climbing appendages according to an embodiment of the invention.

When the substrate is vertical (e.g., when robot 200 is climbing), appendages with climbing features may be used to improve footholds by caging larger features or taking advantage of asperities. FIG. 8 is side elevation view of a robot 200 with climbing appendages according to an embodiment of the invention. Robot 200 is shown climbing vertical substrate 10. A possible appendage implementation may include the front legs using hook-like toes 802 and the back legs using barb-like toes 804 to ensure adequate reaction forces from substrate 10.

The aforementioned control for robotic crawl gait behavior may provide one or more advantages. For example, control system 100 may perform the behavior control with no added exteroceptive sensors needed to choose footholds (although control system 100 may use any exteroceptive sensors that are available). The robot may be described as moving "blindly," using limb loading feedback to delay and alter steps and maintain stability.

Control system 100 may perform the behavior control with no feedforward clock signals, meaning the robot may reactively adapt to terrain height changes and body perturbations.

The behavior control may allow the robot to react to missed footholds and leg slips. While some prior research addresses these issues by detecting excessive body tilt and compensating with leg extension, the proprioceptive (or sensed) leg loading estimation described above may work at a much faster time scale (e.g., before the robot's body angle significantly changes), resulting in more stable walking on rough terrain and more safety in climbing (where it may be impossible to recover from a significant change in body angle in some situations).

Dynamic Door Opening with Legged Robot

Control system 100 may be configured to control robot 200 to open doors. For example, in various embodiments, legged robot 200 may be configured to open a full sized, weighted or unweighted door. Control system 100 may control robot 200 to perform dynamic maneuvers to overcome size and/or force constraints. Robot 200 may be configured to operate a rotary knob and/or push latch handle. Control system 100 may enable proprioceptive triggering on knob/salient feature by one limb 300. In some cases, one limb 300 may be used to operate the feature, while other limb(s) 300 may be used to apply normal force on door. Control system 100 may utilize high actuator transparency (or fast and accurate force sensing) and high bandwidth actuation because of limited time in contact with door. The robot 200 itself may be made robust to be able to throw itself at door (e.g., without breaking gears or other mechanical parts).

Figure 9:
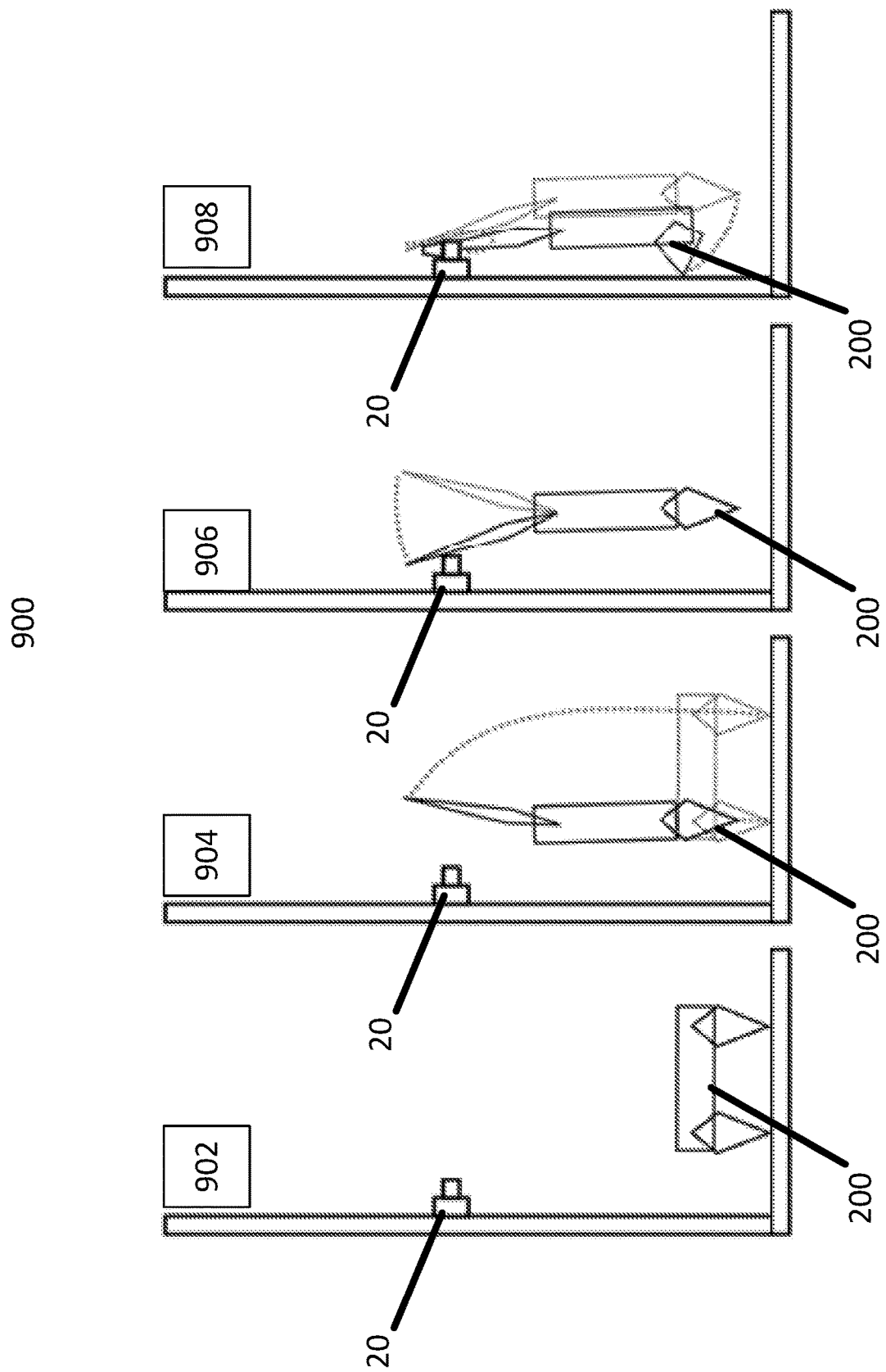
FIG. 9 is a door opening sequence according to an embodiment of the invention.

FIG. 9 is a door opening sequence 900 according to an embodiment of the invention, wherein robot 200 manipulates door handle 20. This behavior may be a composition of three sub-behaviors controlled by control system 100, shown after the initial setup 902 where robot 200 is standing in a specific position in front of the door. The three sub-behaviors may be as follows:

1) Leap 904: Since robot 200 is too short to reach the door handle 20 in normal operation, it may jump onto fewer legs or even off the ground completely.
2) Triggering 906: One of the legs may be extended so that part the leg will come into contact with the handle at some point during the leap before robot 200 hits the door or falls back to the ground. Either proprioceptive force estimation or a force sensor (or network) may be used to "feel" the door handle 20, modelled as a tangential force on the leg of a given magnitude.
3) Handle Pushing 908: Once contact with the handle 20 has been established, one or more legs may be used to push/pull the handle to turn it (this may also be accomplished with the help of a gripper on the end-effector) or one or more legs may be used to push the handle 20 to disengage the locking mechanism. At the same time, one or more legs may push off the door so that once the locking mechanism is disengaged, the door will swing open.

Once the door has been opened slightly, and there is no longer a need to disengage the locking mechanism via the handle 20, different strategies can be used to open it the rest of the way such as repeating leap 904 and pushing 908.

Triggering 906 and handle pushing 908 may both occur before robot 200 falls back to the ground and while robot 200 is in contact with the door (e.g., which may be on the order of 0.25 seconds). Accordingly, sensitive force sensors and/or proprioception may be employed, in addition to high actuation bandwidth. Robot 200 may also be able to recover and land smoothly as it pushes off the door.

The aforementioned door opening sequence may decrease continuous/peak force requirements on robot 200. Robot 200 may open a door using this strategy without necessarily being able to exert required forces to continuously hold the door open. For a very heavy door compared to robot 200, robot 200 may begin the behavior from a running start, and leap 904 and handle pushing 908 actions may have a very large horizontal force.

The aforementioned door opening sequence may grant smaller robots 200 access to standard-sized doors. A small robot 200 may open a door whose handle 20 is outside its kinematic workspace. For a very large door compared to robot 200, robot 200 may begin the behavior from a running start, and leap 904 and handle pushing 908 actions may have a very large vertical force.

Quadrupedal Bounding with Active Phase Control

Control system 100 may control robot limbs to perform bounding. Bounding behavior may alternate front/hind leg pair touchdown as the robot moves in its sagittal plane.

Control system 100 may use decoupled and identical monoped controllers, as discussed below, on front and rear virtual legs (pair/group of legs behaving as one), which may reduce the number of parameters and tuning required. Vertical hopping control may be implemented with physical or virtual compliance. Hopping height may be controlled using active stiffness, active damping, or other means of injecting energy. Control system 100 may use virtual or variable mechanical compliance to adjust leg stiffness according to speed and terrain compliance. Dynamical stability of the bounding control may avoid the need to plan individual footsteps. Stance control may be event-driven, as opposed to clock-driven, and may therefore be relatively robust to terrain height differences and external perturbations. Active phase control may be implemented by estimating the phase of each hip and using the phase difference as feedback into the desired hopping heights with the goal of separating the front/rear phases as much as possible. Coupling through body together with active phase control may maintain pitch oscillations at a range of speeds.

The following table introduces some symbols used in the discussion of the bounding control processing performed by control system 100 and the meanings of these symbols.

TABLE 2

Symbols Found in Bounding Control Algorithms

| Symbol | Meaning | Symbol | Meaning |
|---|---|---|---|
| $r_i$ | Radial leg length | $\rho$ | Nominal leg length |
| $\omega$ | Leg (virtual) compliance spring-mass frequency | $\theta_i$ | Leg angle |
| $f_i$ | Commanded radial leg force | $\tau_i$ | Commanded hip torque |
| $\psi_i$ | Estimated leg phase | $i$ | Leg number (1 or 2) |
| $\Delta f$ | Output of phase controller | $\epsilon_{td}$ | Touchdown threshold |
| $\dot{x}$ | Fore-aft speed of the body | $T_F$ | Nominal flight period |
| $T_s$ | Nominal stance period | | |

Figure 10:
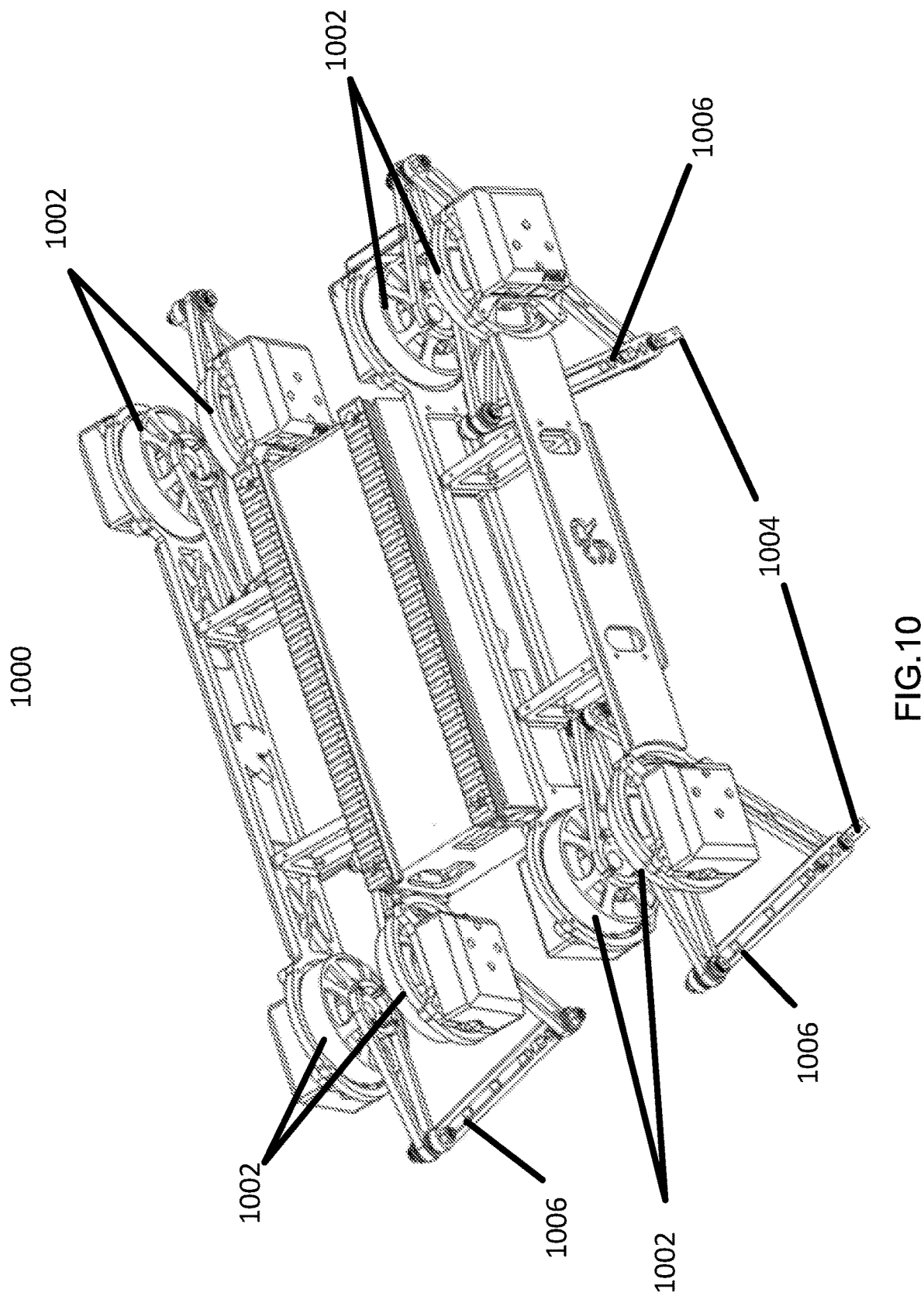
FIG. 10 is a perspective view of a robot configured for bounding according to an embodiment of the invention.
Figure 11:
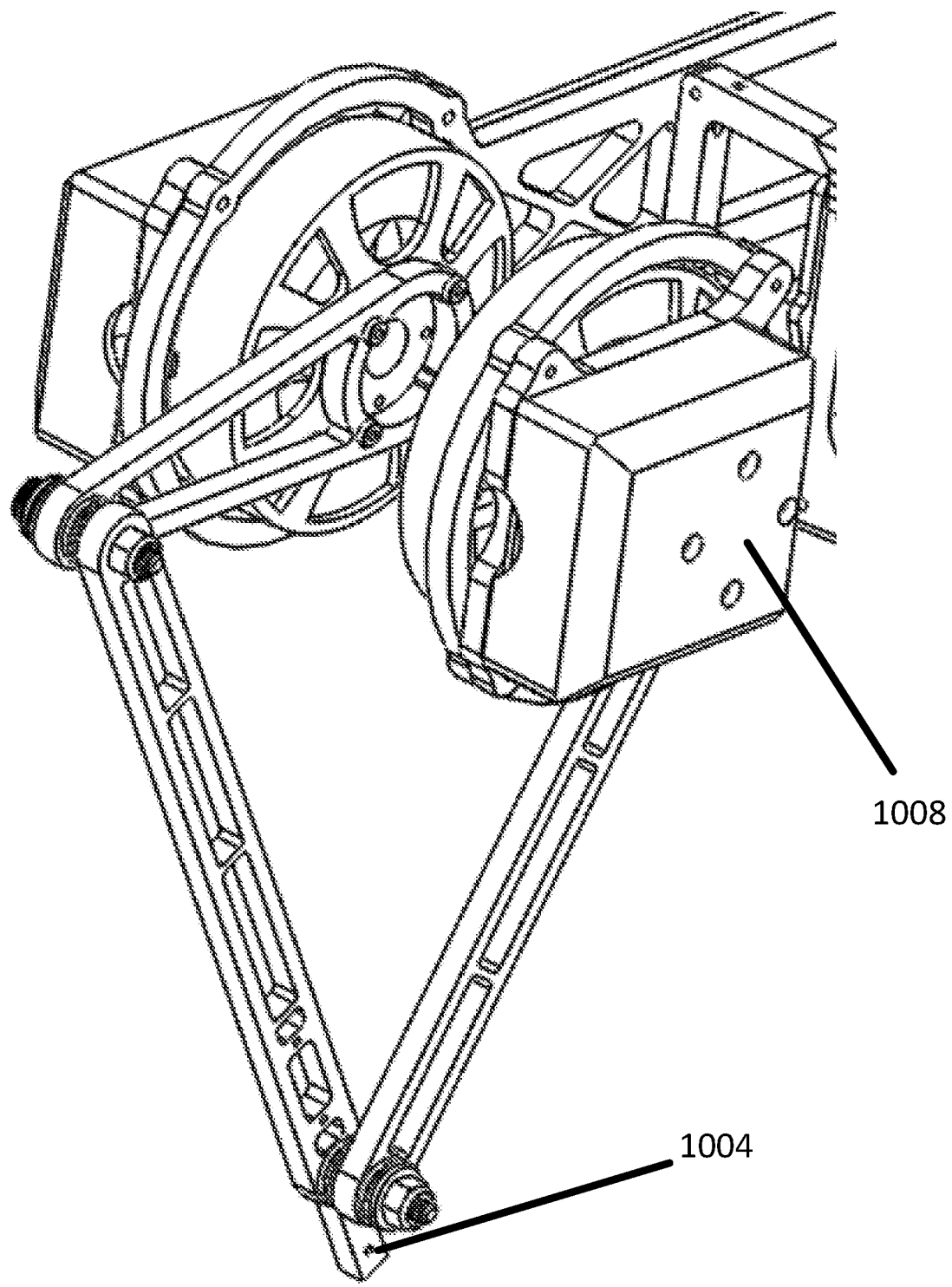
FIG. 11 is a perspective view of a robot bounding limb assembly according to an embodiment of the invention.

FIG. 10 is a perspective view of a robot 1000 configured for bounding, and FIG. 11 is a perspective view of a robot 1000 bounding limb assembly 1100, according to an embodiment of the invention. Robot 1000 may be a quadrupedal robotic platform with at least 8 actuators 1002, or a sagittal plane bipedal robot with at least four actuators and some passive mechanism to stabilize out-of-sagittal-plane motions. Each pair of legs (i.e., the front pair and the hind pair) may be referred to as a "virtual leg." The sagittal bipedal robot may also have two virtual legs. In the example quadrupedal robot 1000, each virtual leg may be controlled by two sets of "virtual actuators," which may each comprise two actuators 1002 for a total of four per virtual leg. Virtual actuators may be capable of independently controlling the virtual leg extension and angle. The two actuators 1002 per pair may be connected with any form of mechanical linkage 1006 (e.g., five-bar, serial, etc.) to terminate in a point to 1004. Each motor may be driven by a motor controller with the ability to measure the motor angle precisely using any kind of position sensor 1008. Robot 1000 may include control system 100 (not shown).

Figure 12:
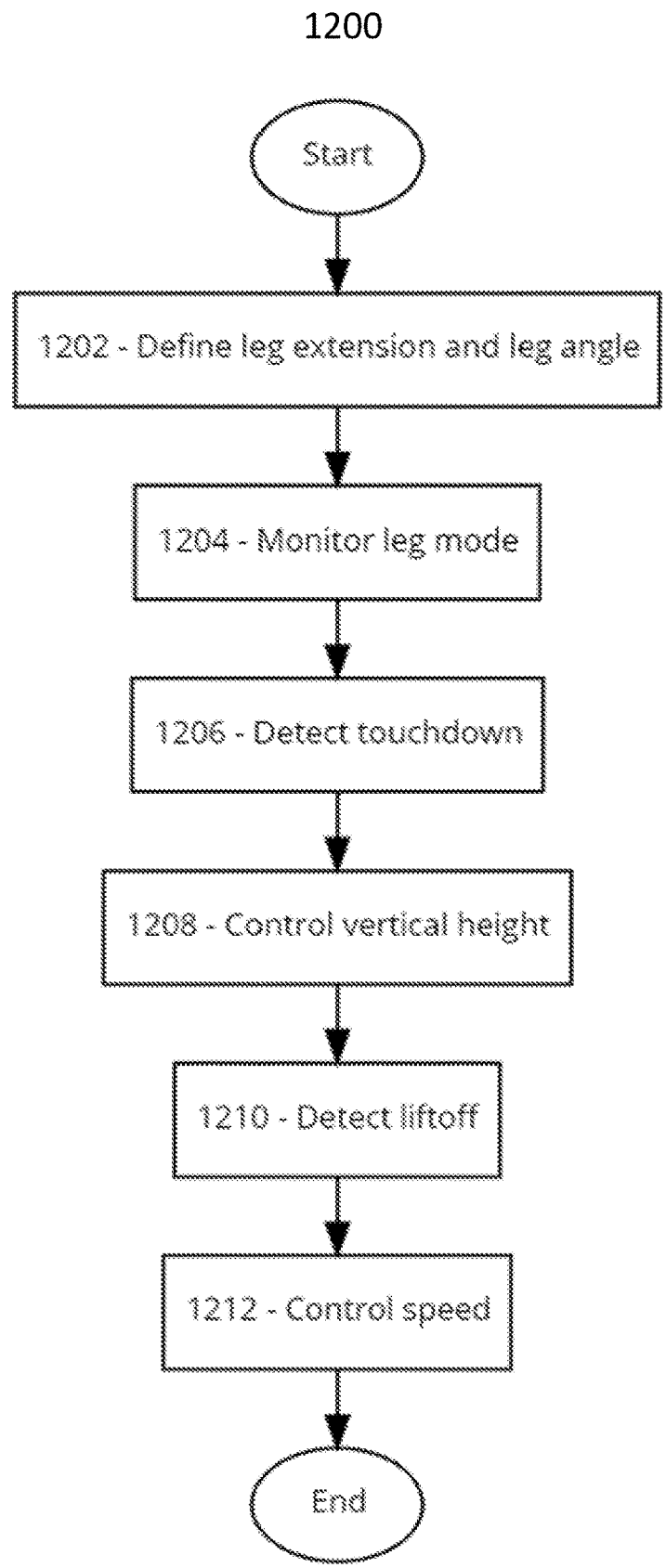
FIG. 12 is a bounding control process according to an embodiment of the invention.

FIG. 12 is a bounding control process 1200 according to an embodiment of the invention. Control system 100 may perform process 1200 to control bounding. Process 1200 is shown for a single bound cycle, but certain steps (e.g., 1204-1212) may be repeated as robot 1000 continues to traverse an environment by bounding.

Control system 100 may define leg extension and leg angle 1202. Leg extension may be defined as $r_i$ (physically the distance from the hip to the toe). Leg angle may be defined as $\theta_i$ (physically the angle made by the hip-toe line segment with the vertical). Irrespective of the specific leg linkage used, these configuration variables may be defined the same way in some embodiments.

Bounding may be characterized as a sequence of touchdowns and liftoffs. Control system 100 may keep track of the "mode" of each leg 1204, either STANCE or FLIGHT. Transitions between modes may be event-based: from FLIGHT to STANCE on TOUCHDOWN, and from STANCE to FLIGHT on LIFTOFF.

Control system 100 may detect a touchdown 1206. Touchdown detection may be implemented using proprioception through motor deflection, i.e. if $|r_i - \rho| > \epsilon_{td}$ and $\dot{r}_i < 0$, or an external sensor placed at the toe measuring the normal force between the ground and the toe, i.e. $f_{toe} > \epsilon_{td}$. When a touchdown is detected, robot 1000 may be in STANCE mode.

Control system 100 may control robot 1000 in STANCE mode 1208. In STANCE mode, control system 100 may perform vertical height control as follows: $f_i = -\omega^2(r_i - \rho) - k_a \cos \psi_i + \Delta f_i$, where the last term is the active phase control term.

Control system 100 may detect a liftoff 1210. Liftoff detection may be performed similarly to touchdown detection: if $|r_i - \rho| > \epsilon_{td}$ and $\dot{r}_i > 0$, or $f_{toe} < \epsilon_{td}$. When a liftoff is detected, robot 1000 may be in FLIGHT mode.

Control system 100 may control robot 1000 in FLIGHT mode 1212. In FLIGHT mode, control system 100 may perform speed control as follows: $\tau_i = -k_p(\theta_i - \theta_{des}) - k_d \dot{\theta}_i$, where $\theta_{des}$ is chosen such that $\rho \sin \theta_{des} = \dot{x} T_s / 2$, where $T_s$ is the nominal stance period.

Figure 13:
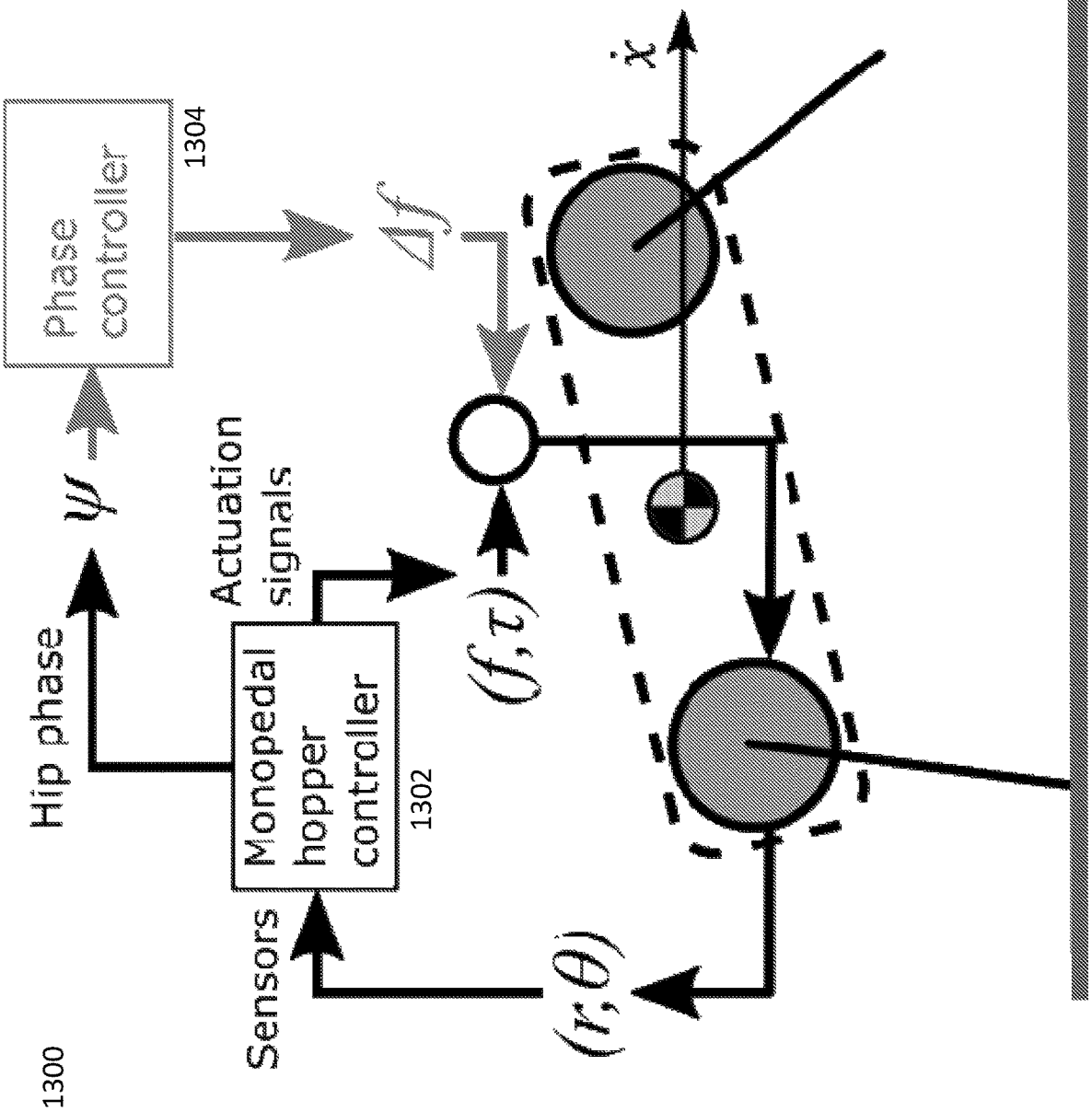
FIG. 13 is a bounding control signal flow diagram according to an embodiment of the invention.

FIG. 13 is a bounding control signal flow diagram 1300 according to an embodiment of the invention. As shown, monopedal hopper controller 1302 and phase controller 1304 (which may each be components of control system 100) may use received sensor data to provide actuation and phase control signals for robot 1000 movement. There may be no need for active pitch control, since the actively controlled phase difference and the vertical controllers (which may active control the height of each virtual hip) may together coordinate the body pitch. The active phase control may be implemented as $\Delta f_i = k_\psi \sin \psi_i \sin(\psi_1-\psi_2)$. This implementation may cause the phase difference $\psi_1-\psi_2$ to go to $\pi$. The phase of each leg may be estimated using different methods. For example, the estimation may use the nominal time of stance and time of flight as follows: $\psi_i := \pi(t-t_{TD})/T_S$ in STANCE, and $\psi_i := \pi(t-t_{LO})/T_F$ in FLIGHT. These formulae for $\psi_i$ are designed so that $\psi_i$ lies between 0 and $2\pi$. The desired phase difference, $\psi_1-\psi_2=\pi$, may mean that the front and rear virtual legs are exactly out of phase, so the front and rear touchdowns may happen at equally spaced intervals in an alternating fashion. The phase control may not need dedicated sensors or actuators, as control system 100 may use phase information which may be computed from the measured leg state, and its output may be directly added to the radial force commanded to each leg.

The aforementioned control for robotic bounding behavior may provide one or more advantages. For example, reactive control may allow robustness to terrain height differences and perturbations since there is no clock signal driving the legs. The gait may operate at a continuum of operating points in vertical height and forward speed with no additional tuning necessary. Active phase control may allow pitch oscillation to continue at high locomotion speeds as well as a wide range of body inertia, hence allowing the legs to recirculate in swing phase without toe stubbing.

Reactive Stair Climbing and Simultaneous Modelling with Legged Robot

Control system 100 may control robot limbs to perform stair climbing. While climbing, legs may use high-bandwidth (e.g., from a direct-drive or high-bandwidth geared actuator) to trace contour of stairs' salient features (e.g., interfaces at tread and riser) to estimate both stair parameters and robot state (which may both help improve ascent/descent). Legged climbing may be possible even if the critical dimensions (e.g., riser, tread) exceed robot's kinematic workspace, as discussed below.

The following table introduces some symbols used in the discussion of the stair climbing control processing performed by control system 100 and the meanings of these symbols.

TABLE 3

Symbols Found in Stair Climbing Control Algorithms

| Variable | Definition |
| --- | --- |
| m | Mass of platform (kg) |
| g | Acceleration of gravity (9.8 m/s²) |
| R | Rise of the stair (m) |
| T | Tread of the stair (m) |
| θ | Take-off angle of the hind legs with the stair tread (radians) |
| $v_x$ | Horizontal velocity of the platform (m/s) |
| $u_{max}$ | Maximum allowable energy at a given take off angle (J) |
| $u_{min}$ | Minimum energy requirement for reaching next stair (J) |

Figure 14:
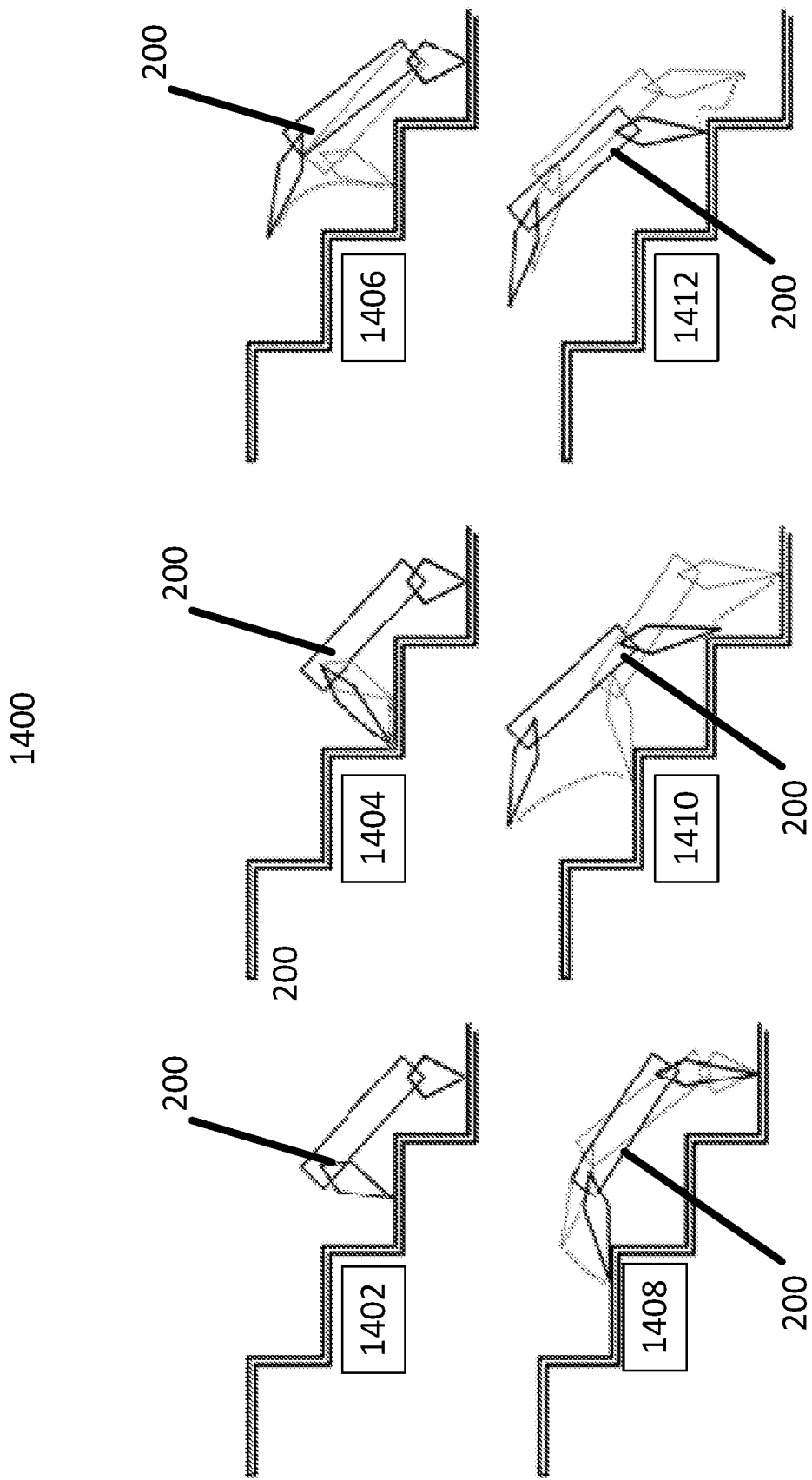
FIG. 14 is a stair climbing sequence according to an embodiment of the invention.

FIG. 14 is a stair climbing sequence 1400 according to an embodiment of the invention. The stair climbing behavior may be broken into multiple sub-behaviors, three of which may be done as initial measurement and as a first step, and the remaining three which may be repeated as a bound.

In 1402, robot 200 is initially stationary on two stairs. Control system 100 may use proprioception and body pitch for estimation of the rise of the staircase. In 1404, robot 200 may extend its front limbs feeling for the back of the first stair. Once contacted, control system 100 may determine an estimate of the tread of the staircase. In 1406, control system 100 may initiate the behavior by controlling robot 200 to hop with the front legs and re-circulate them to prepare contact with the next tread and for the repeatable set of sub-behaviors.

Control system 100 may control robot 200 to repeat the following set of behaviors to bound up the stairs. In 1408, robot 200 may have its back legs in contact with the floor and its body pitching downward due to gravity towards the next stair. In 1410, control system 100 may use force sensing feedback from the forelimbs to end the first phase and trigger the beginning of the second phase, where the forelimbs may "pull" against the stair they have just come into contact with, and shortly thereafter, the hind limbs may begin pushing against the lower stair. This behavior may terminate at some pre-determined extension length of the lower limbs. Robot 200 may then be airborne. In 1412, to return to the initial phase 1408, control system 100 may control the hind limbs as active whiskers to find the riser of the next stair, and then retract along the riser to find the corner. Once the corner is found, control system 100 may place the toes in an appropriate position on the next stair and begin the cycle of sub-behaviors 1408-1412 over again.

To inform the takeoff angle and power of 1410 the estimates of stair rise, R, and stair tread T (gathered in steps 1402 and 1410 respectively) may impose a minimum energy requirement as follows:

$$u_{min} = \frac{mgR}{\sin^2\theta}$$

Where theta is the takeoff angle on the tread in step 1410. This condition may ensure that robot 200 has the minimum height to clear the next step. Care may also be taken to ensure that robot 200 does not overrun its landing on the subsequent stair in step 1412, ensuring that the behavior is stable.

Figure 15:
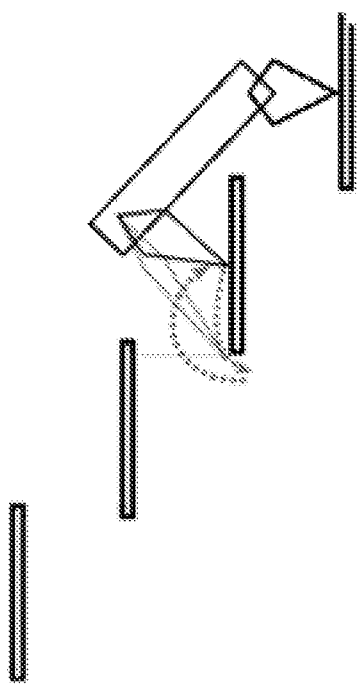
FIG. 15 is a stair detection according to an embodiment of the invention.

In 1404, some stair cases may not have risers to contact, and the fore limbs of robot 200 may drop of the back of the tread of that stair. Because of the high bandwidth, control system 100 may use the legs to sense the absence of expected normal force from the ground then recirculate underneath the body quickly enough so that robot 200 does not fall. In addition, noting when the loss of ground contact occurs on the legs, control system 100 may estimate the length of the tread of the stair. For example, FIG. 15 shows a stair detection 1500 in the absence of stair risers.

Figure 16:
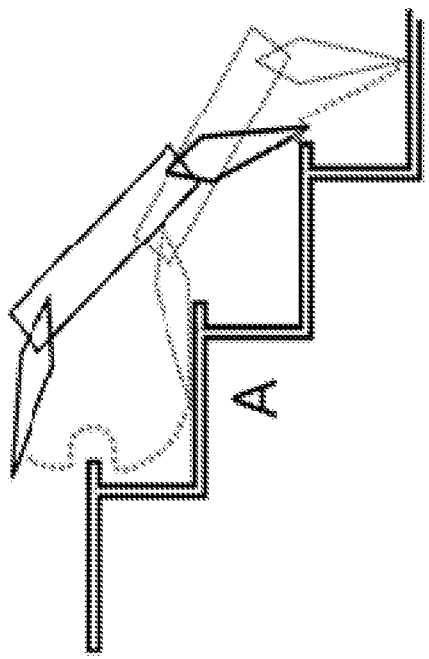
FIG. 16 is a stair navigation according to an embodiment of the invention.
Figure 16:
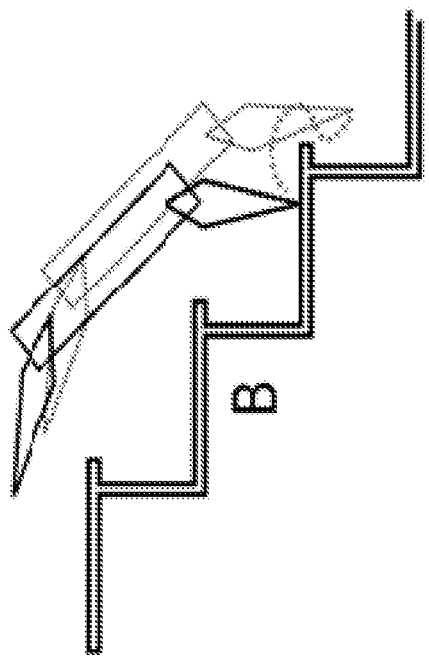

Furthermore, some staircases may have significant overhangs. However, these overhangs may not interfere with robot 200 behavior, because the high bandwidth motion of the legs and ability to sense small forces on the legs may allow robot 200 to recirculate its limbs around such contours. For example, see stair navigation 1600 of FIG. 16. Force sensors or force estimates using proprioception may be used to not only trigger the end of the first phase agnostic to the stair dimensions, but also to provide information about pose of robot 200 by comparing the reaction forces from the right and left forelimbs to determine rolling attitude/moments.

Successful climbing behavior may be dependent on measuring and controlling the forward velocity of the robot, to avoid collisions with oncoming stairs and to ensure that the hind limbs have adequate tread to push off of. In this behavior, control system 100 may leverage accurate measurements of limb velocities and rotational velocity of the body (e.g., see 1404 above), and later accurate measurements of limb velocities when active whiskering the corner of the stair (e.g., see 1408 above).

Figure 17:
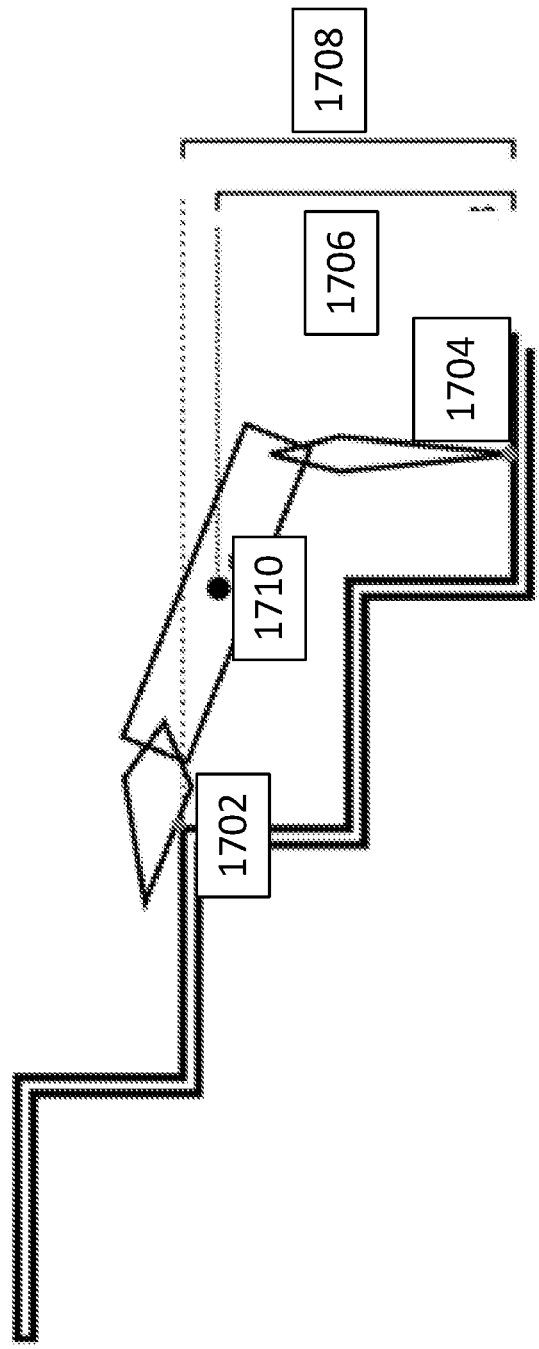
FIG. 17 is a mismatched stair navigation according to an embodiment of the invention.

Stairs can be considered mismatched under the conditions that the height (riser) of the stair is similar or greater than the hip height of the legged robot. If this is true, the stair may be treated as a topping-out on a ledge maneuver as long as the length (tread) of each stair can accommodate the length of the robot in stance. If not, it may be inferred that the robot must span at least two stairs (as shown in FIG. 17, for example) in stance, and must span at least three steps to start climbing, where the support polygon formed by 1702, 1704 with the hind legs fully extended (1706), may dictate that the COM (1710) is not higher than the next riser, which is two riser heights (1708) from the contact point 1704. Thus, the stair climbing may be considered mismatched if the stair height is at least higher than the hip height, the run of the stair is shorter than the robot length in stance and, the rise of at least two steps is greater than the support polygon.

The aforementioned control for stair climbing behavior may provide one or more advantages. For example, other stair climbing strategies fall into three categories:
1) Open loop (no sensing, the machines are just playing back clocked trajectories)
2) Closed loop with stair information provided a priori
3) Closed loop using external sensing (camera, laser, etc.) to measure stair properties before climbing.

The aforementioned control strategy may be different in that it may be reactive and may trigger based on salient stair features (tread-riser interface) while climbing. This may enable reliable ascent as the stair dimensions and robot velocity can be inferred by the triggering.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of controlling bounding of a robot, the method comprising:

determining, with a robot control system, that at least one of a plurality of limbs of the robot is on a surface, wherein the determination that the at least one of the plurality of limbs of the robot is on the surface comprises detecting a touchdown of the at least one of the plurality of limbs by determining that the at least one of the plurality of limbs is partially retracted and retracting;

controlling, with the robot control system and based on the detection of the touchdown, the at least one of the plurality of limbs to push off the surface to project the robot to a vertical height such that the robot is displaced from the surface;

determining, with the robot control system, that the at least one of the plurality of limbs has lost contact with the surface; and controlling, with the robot control system, the at least one of the plurality of limbs to propel the robot at a speed after the determining of lost contact.

2. The method of claim 1, further comprising defining, with the robot control system, a limb extension and a limb angle for the at least one of the plurality of limbs prior to the controlling of the at least one of the plurality of limbs to push off the surface to project the robot to a vertical height.

3. The method of claim 1, wherein the controlling the at least one of the plurality of limbs to propel the robot comprises controlling a body pitch of the robot.

4. A system for controlling bounding of a robot, the system comprising:

a robot control system coupled to a plurality of limbs of the robot, the robot control system configured to:

determine that at least one of the plurality of limbs of the robot is on a surface, wherein the determination that the at least one of the plurality of limbs of the robot is on the surface comprises detect a touchdown of the at least one of the plurality of limbs by determining that the at least one of the plurality of limbs is partially retracted and retracting;

control, based on the detection of the touchdown, the at least one of the plurality of limbs to push off the surface to project the robot to a vertical height such that the robot is displaced from the surface;

determine that the at least one of the plurality of limbs has lost contact with the surface; and control the at least one of the plurality of limbs to propel the robot at a speed after the determining of lost contact.

5. The system of claim 4, wherein the robot control system is further configured to define a limb extension and a limb angle for the at least one of the plurality of limbs prior to the controlling of the at least one of the plurality of limbs to push off the surface to project the robot to a vertical height.

6. The system of claim 4, wherein the controlling the at least one of the plurality of limbs to propel the robot comprises controlling a body pitch of the robot.

\* \* \* \* \*